Figure 1:
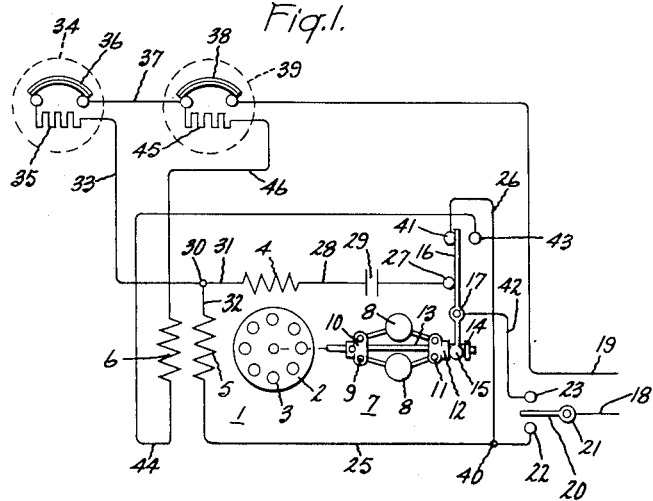

June 26, 1956  R. E. SEELY  2,752,548

DYNAMOELECTRIC MACHINE

Filed March 24, 1954

INVENTOR.
Richard E. Seely,
BY
His Attorney.

United States Patent Office 2,752,548
Patented June 26, 1956

2,752,548
DYNAMOELECTRIC MACHINE

Richard E. Seely, Fort Wayne, Ind., assignor to General Electric Company, a corporation of New York Application March 24, 1954, Serial No. 418,259

7 Claims. (Cl. 318—221)

This invention relates to dynamoelectric machines and more particularly to a multispeed motor circuit having inherent thermal protection.

There are many purposes which, to be achieved properly, require the use of a multispeed motor. Where, as frequently occurs, it is desirable that the motor come up to speed rapidly, it has become customary to do this by means of the winding which is provided for the highest speed and then to switch the motor over to the winding which will provide the speed which has been selected. In the past it has been found extremely difficult, however, to provide adequate thermal protection for the windings under all circumstances when this type of motor is utilized. One reason for this is that the motor power requirements vary greatly between speeds; it therefore follows that a proper protector for a low speed winding will be entirely insufficient if the motor is run at a high speed, and a proper protector for a high speed winding will not afford sufficient protection for a winding which is used for a lower speed. As a result of this difficulty, multispeed motors in the past have generally been provided with adequate winding protection only under starting conditions and for the winding with which the start winding has been associated, which may be either a low or high speed running winding, depending upon the type of motor. Thus, the motor has been protected under locked rotor conditions and at one specific speed against overload, the other speed, or speeds, having little or no thermal protection. It is obviously desirable to achieve a multispeed motor wherein adequate protection for the windings will be afforded at all times; the protection for each winding should be made to vary with the construction and power requirements of each winding individually.

It is, therefore, an object of this invention to provide an improved multispeed motor circuit which will incorporate the desirable features enumerated above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in one embodiment thereof, provides a multispeed motor adapted to be started on a predetermined winding whatever the selected speed; at a predetermined speed of rotation the start winding will be deenergized and the selected winding will be energized. In the case where the motor starts by using the selected running winding in conjunction with the starting winding there will, of course, be no change in the selected running winding. A protector is provided for each running winding and the heating coil of each protector is connected in series with its associated winding. The deformable circuit-breaking parts of the protectors are connected in series with each other in the line. Thus, whichever heating coil be the cause, an opening of any protector will cause complete deenergization of all windings. It will, however, be seen that, since the heating elements themselves are in separate circuits, each one may be individually constructed to best suit the needs of the winding with which it is associated.

In a modification of this basic idea a single circuit breaking element may be provided with, however, the heating coils in parallel as before.

Figure 2:
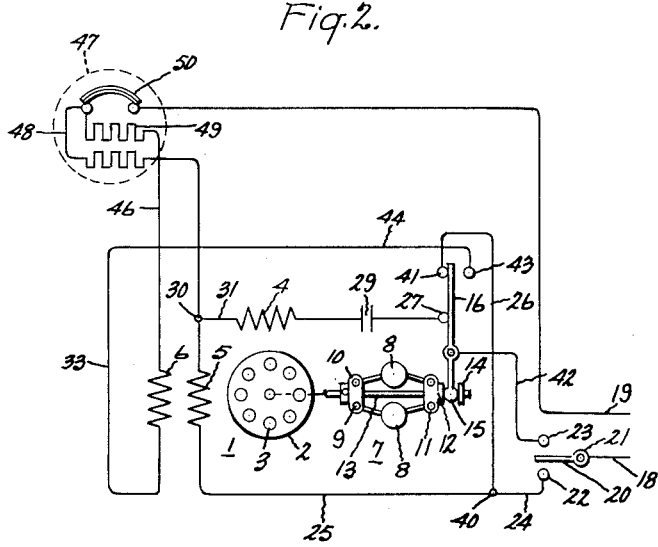

In the drawing,

Figure 1 is a schematic diagram of a two speed motor embodying the novel protector circuits of this invention; and Figure 2 is a schematic diagram of a modified circuit for providing improved winding protection for a two speed motor.

Referring now to Figure 1 of the drawing, there is schematically shown an alternating current induction motor, generally indicated by the numeral 1, having a rotor 2 containing squirrel cage bars 3 which are short circuited at their ends, generally by end rings (not shown). The motor field is provided with a start winding 4, a high speed running winding 5, and a low speed running winding 6. Rotor 2 is connected to a centrifugal mechanism 7 so as to cause it to rotate therewith. Centrifugal mechanism 7 has fly weights 8. These fly weights are pivotably secured by means of pins 9 in member 10 and pins 11 in member 12. Member 12, in turn, is slidably mounted on shaft 13 and is fixedly fastened to part 14, which is formed to slide along shaft 13 when member 12 is pulled to the left by fly weight 8. The end 15 of a contact arm 16 which is pivoted at 17 is mounted so as to be carried along with part 14.

Motor 1 is connected to a source of single phase alternating current power by means of supply lines 18 and 19. Supply line 18 is provided with a switch arm 20 pivotable about point 21 and which is adapted to contact line 18 with either terminal 22 or terminal 23. Terminal 22 is connected by means of lines 24 and 25 to high speed winding 5. This terminal is also connected to start winding 4 by means of line 26, contact 41, contact arm 16, contact 27, and line 28 which contains a capacitor 29 in order to provide an angular displacement of start winding 4 from each of running windings 5 and 6. Windings 4 and 5 are joined at point 30 by means of lines 31 and 32 respectively. The circuit then leads through a line 33 to a protector device, generally indicated at 34. Heating coil 35 of protector 34 is connected in series with line 33 and with bimetallic element 36 of the protector. Coil 35 is preferably in close physical proximity to element 36. The circuit is completed through line 37, bimetallic element 38 of a second protector 39 and back to line 19.

When line 18 is connected by means of switch arm 20 to terminal 23, start winding 4 is connected thereto by means of line 42, contact arm 16, contact 27, and line 28 containing capacitor 29. High speed winding 5 is also connected in the line by means of line 42, contact arm 16, contact 41, line 26, point 40 and line 25. At a predetermined speed contact arm 16 will leave contacts 27 and 41, thereby disconnecting windings 4 and 5, and move over to engage contact 43. This contact is connected to low speed winding 6 by means of line 44; the low speed winding in turn is connected to heating element 45 of the second protector device 39 by means of line 46. Element 38 and line 19 will then complete the circuit. As in protector 34, the coil 45 is preferably positioned very close to element 38.

The operation of the two speed motor as shown, will now be described. Assuming that high speed operation is desired, switch arm 20 connects line 18 to terminal 22. The start winding circuit then is through line 24, line 26, contact 41, contact arm 16, contact 27 and line 28 to winding 4, and then through line 31 to point 30. The high speed winding circuit will be through line 24 and line 25 to high speed winding 5 and then through line 32 to point 30. The circuit will then be completed through line 33, coil 35, element 36, line 37 and element 38 out to line 19. It will be observed that while bimetallic element 38 of the second protector 39 is in the circuit, heating element 45 thereof is not. Deenergization of the windings depends, therefore, principally on coil 35 of protector 34 which has been especially chosen in view of the properties of winding 5 with which it is associated. At the predetermined speed contact 16 will move to the right to disconnect starting winding 4, and the motor will run on high speed winding 5 alone.

If low speed operation is desired, switch 20 is moved to connect line 18 with terminal 23. As before, windings 4 and 5 will be energized, winding 4 being energized through line 42, contact arm 16, contact 17 and line 28, and winding 5 being energized through line 42, contact arm 16, contact 41, line 26, and line 25. Thus, initially the operation will be precisely the same as before, with protector 34 and only the bimetal element 38 of protector 39 being in the circuit. When the motor has come up to the predetermined speed centrifugal mechanism 7 will cause contact arm 16 to move to the right and engage contact 43, at the same time, opening the circuits to windings 4 and 5 by disengagement with contacts 27 and 41. The circuit will then travel from contact 43 through line 44 to winding 6, and thence through line 46, coil 45 and bimetallic element 38 out to line 19. It will now be apparent that now that winding 6 is being utilized alone protector 34 is no longer in the circuit and protector 39, especially designed for the needs of winding 6, is the only protector included in the circuit.

Referring now to Figure 2, the modified circuit shown therein will be described using the same numerals as in Figure 1 for like parts. It will be seen that the centrifugal mechanism 7, the motor 1 including windings 4, 5 and 6, the contacts 27, 41 and 43, contact arm 16, and the switching apparatus are precisely the same as in the embodiment of Figure 1. However, in lieu of two separate protectors a single protector 47 is provided. Protector 47 includes a pair of heating coils 48 and 49 connected in parallel and which take the place of coils 35 and 45 respectively. A single bimetallic element 50 is provided in lieu of the two separate bimetallic elements 36 and 39 of the embodiment of Figure 1. It will thus be seen that the operation of the embodiment of Figure 2 is precisely the same as that shown in Figure 1. Heating coil 48 alone will be connected in the circuit when winding 5 is energized and heating coil 49 will be the only one in the circuit when winding 6 is energized. Thus, each of the two coils 48 and 49 may be selected with regard for the particular properties of the winding with which each is associated. The only difference is that a single bimetallic element is used instead of the two bimetallic elements of Figure 1. This will in no way, however, impair the protection of the windings since that protection is principally dependent upon the construction of the heating coils, and the separate heating coils are still present.

It will now be seen that I have provided a two speed motor circuit wherein protection is afforded the entire motor at all times according to the need of the individual winding in use and the amount of power to which it is subjected. It will further be seen that this protection is afforded economically and simply, without any need for complication of the circuit.

While this invention has been explained by describing a squirrel cage rotor induction motor, it will be understood that the invention is not limited to this type of motor. It will further be understood that the speed responsive means and the starting means shown are used for purposes of illustration, and that the invention is not restricted thereto. By the same token, the starting means need not necessarily be associated with the high speed winding but may be connected in parallel with any other winding. An important feature of this invention is that it is not limited only to two speed motors but may be used with any number of speeds desired. This is apparent since the only modifications necessary for a multispeed motor having in excess of two speeds would be to provide additional windings in parallel and a modified speed responsive device capable of engaging and energizing the selected winding, such as are well known in the art. While this invention has been explained by describing a particular embodiment thereof, it will be apparent that improvements and modifications may be made without departing from the scope of the invention as defined in the appended claims.

What I claim as new and desire to secure by Letters Patent of the United States is:

1. A multispeed electric motor comprising a plurality of running windings arranged to be selectively energized, a starting winding connected in parallel with one of said running windings, and means operable at a predetermined speed of said motor to stop energization of said starting winding, said running windings being so connected that said starting winding and said running winding in parallel therewith will be energized when any of said running windings is selected while said motor is rotating below said predetermined speed, said means being operable at said predetermined speed to effect energization of the selected running winding alone; and protective means for said windings comprising heating elements serially connected with said windings respectively and selectively operable with said windings, and bimetallic elements serially connected with said heating elements and said running and starting windings respectively to disconnect the same at a predetermined temperature, said bimetallic elements being in physical proximity to said heating elements respectively and being serially connected.

2. A multispeed electric motor comprising a plurality of running windings arranged to be selectively energized, a starting winding connected in parallel with one of said running windings, and means operable at a predetermined speed of said motor to stop energization of said starting winding, said running windings being so connected that said starting winding and said running winding in parallel therewith will be energized when any of said running windings is selected while said motor is rotating below said predetermined speed, said means being operable at said predetermined speed to effect energization of the selected running winding alone; and protective means for said windings comprising heating elements serially connected with said windings respectively and selectively operable with said windings, and a bimetallic element serially connected with said heating elements and said windings to disconnect the same at a predetermined temperature, said bimetallic element being in physical proximity to said heating elements.

3. A multispeed electric motor comprising a plurality of windings arranged to be selectively energized, said windings being so connected that one of said windings will be energized when any of said windings is selected while said motor is rotating below a predetermined speed, and means operable at said predetermined speed to effect energization of the selected winding alone; and protective means for said windings comprising heating elements serially connected with said windings respectively and selectively operable with said windings, and bimetallic elements serially connected with said heating elements respectively to disconnect the same at a predetermined temperature, said bimetallic elements being in physical proximity to said heating elements respectively and being serially connected.

4. A multispeed electric motor comprising a plurality of windings arranged to be selectively energized, said windings being so connected that one of said windings will be energized when any of said windings is selected while said motor is rotating below a predetermined speed, and means operable at said predetermined speed to effect energization of the selected winding alone; and protective means for said windings comprising heating elements serially connected with said windings respectively and selectively operable with said windings, and a bimetallic element serially connected with said heating elements and said windings to disconnect the same at a predetermined temperature, said bimetallic element being in physical proximity to said heating elements.

5. A two speed electric motor comprising a pair of running windings arranged to be selectively energized, a start winding connected in parallel with one of said running windings and electrically displaced therefrom, and means operable at a predetermined speed of said motor to stop energization of said starting winding, said running windings being so connected that said starting winding and said running winding in parallel therewith will be energized when either of said running windings is selected while said motor is rotating below said predetermined speed, said means being operative at said predetermined speed to effect energization of the selected running winding alone; and protective means for said windings comprising a pair of heating coils serially connected with said running windings respectively and selectively operable therewith, and a pair of bimetallic elements serially connected with said heating coils and said windings respectively, said elements being arranged to deform at a predetermined temperature thereby to stop energization of said running windings, said elements being in physical proximity to said coils respectively and being serially connected.

6. A two speed electric motor comprising a pair of running windings arranged to be selectively energized, a starting winding connected in parallel with one of said running windings and electrically displaced therefrom, and means operable at a predetermined speed to stop energization of said starting winding, said running windings being so connected that said starting winding and said running winding in parallel therewith will be energized when either of said running windings is selected while said motor is rotating below said predetermined speed, said means being operative at said predetermined speed to effect energization of the selected running winding alone; and protective means for said windings comprising a pair of heating coils serially connected with said running windings respectively and selectively operable therewith, and a bimetallic element serially connected with said coils and said windings, said element being arranged to deform at a predetermined temperature thereby to stop energization of said running windings and being in physical proximity to said coils.

7. A multispeed electric motor comprising a plurality of windings arranged to be selectively energized, said windings being so connected that one of said windings will be energized when any of said windings is selected while said motor is rotating below a predetermined speed, and means operable at said predetermined speed to effect energization of the selected winding alone; and protective means for said windings comprising heating elements serially connected with said windings respectively and selectively operable with said windings, and bimetallic means serially connected with said heating elements and said windings to disconnect the same at a predetermined temperature, said bimetallic means being in physical proximity to said heating elements.

References Cited in the file of this patent
UNITED STATES PATENTS

| | | |
|---|---|---|
| 1,961,793 | Schaefer | June 5, 1934 |
| 2,068,559 | Michelson | Jan. 19, 1937 |
| 2,225,144 | Bassett | Dec. 17, 1940 |
| 2,259,972 | Ellis | Oct. 27, 1941 |
| 2,269,069 | Werner | Jan. 6, 1942 |
| 2,320,252 | Vaughan | May 25, 1943 |
| 2,382,983 | Ellis | Aug. 21, 1945 |
| 2,689,933 | Veinott | Sept. 21, 1954 |